Aug. 14, 1962     H. F. PARKER ETAL     3,049,217
CONVEYOR GUIDE MEANS
Filed April 3, 1959     2 Sheets-Sheet 1
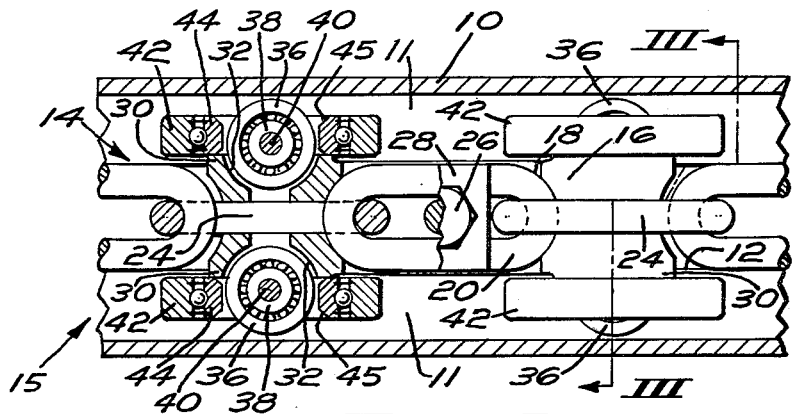
*FIG. 1*
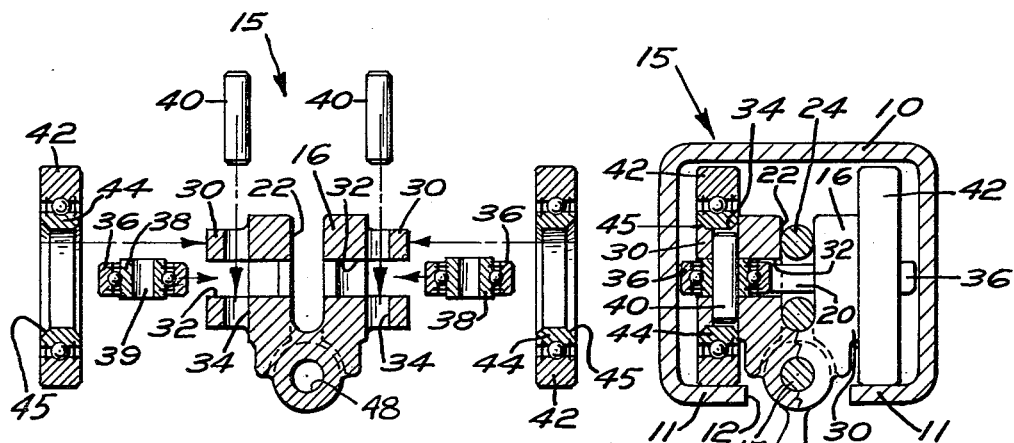
*FIG. 2*
*FIG. 3*
INVENTORS:
HUMPHREY F. PARKER
and ERFORD E. ROBINS
BY:
Beau, Brooks, Buckley & Beau,
ATTORNEYS.

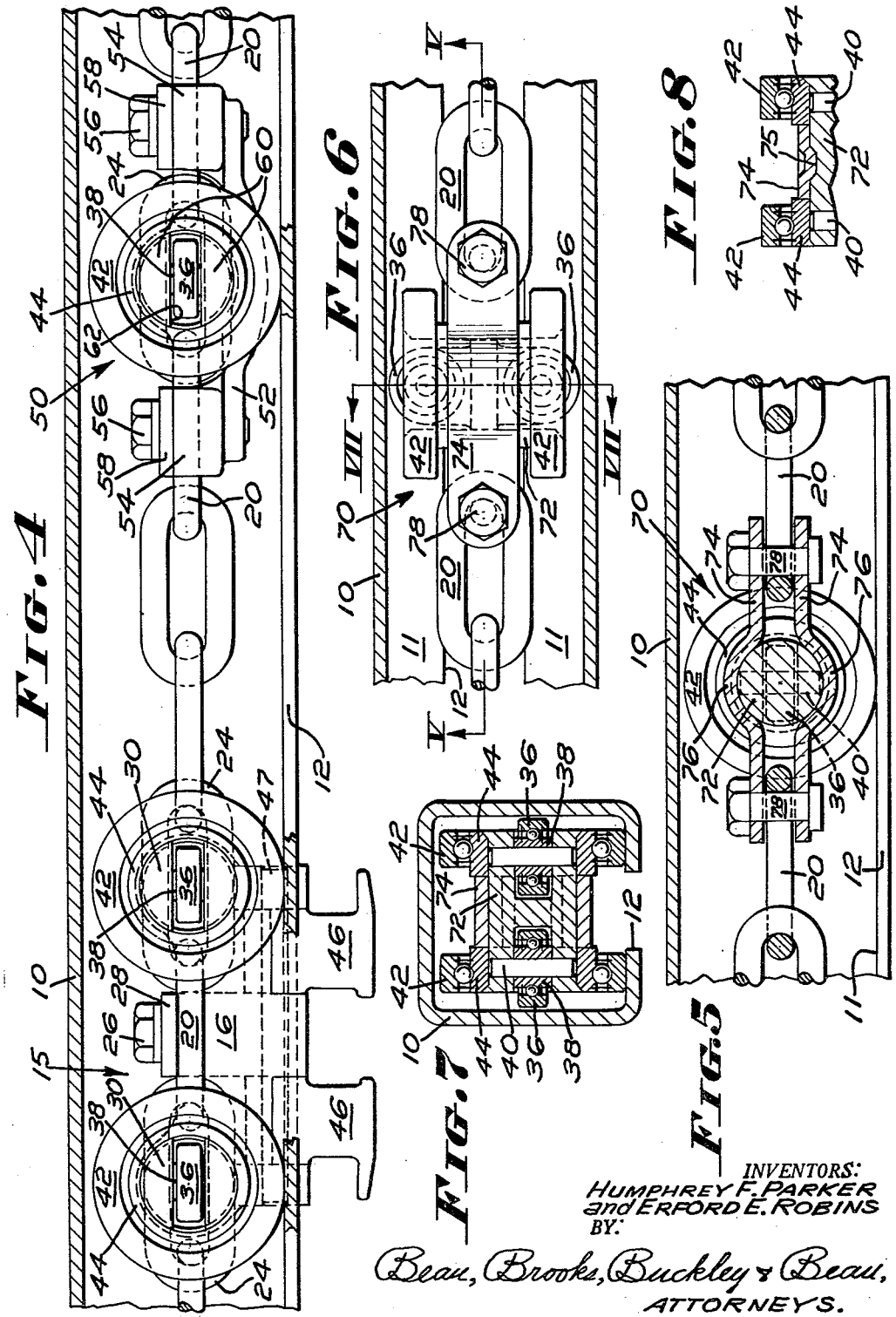

United States Patent Office 3,049,217
Patented Aug. 14, 1962

3,049,217
CONVEYOR GUIDE MEANS
Humphrey F. Parker, Buffalo, and Erford E. Robins, North Tonawanda, N.Y., assignors to Columbus McKinnon Corporation, a corporation of New York
Filed Apr. 3, 1959, Ser. No. 803,859
2 Claims. (Cl. 198—177)

This invention relates to chain-powered conveyors such as employ power chains provided with load carrying hangers or pick-up means for moving trolleys, trucks or other objects along trolley rails, tracks, floorways, or the like; for example, as in manufacturing or warehousing operations. The power chains referred to are preferably provided with guide wheel means attached at intervals therealong to rollingly support and guide the chain in the track system; and the present invention is particularly concerned with improvements in the construction and assembly of such wheel means for use with welded link type chain.

One object of the present invention is to provide an improved construction in guide wheel attachment devices for connection to links in a welded link chain powered conveyor, for use in conveyor systems as aforesaid.

Another object of the invention is to provide an improved guide carriage assembly for attachment to power chains, which employs combinations of vertically and horizontally disposed wheels to provide rolling support for the chain in both horizontal and vertical directions.

Another object of the invention is to provide an improved guide wheel carriage as aforesaid which is of improved and simplified structural form and is adapted to be attached to power chain links at intervals therein throughout the length of the chain.

Other objects and advantages of the invention will become apparent from the following specification, wherein the drawing illustrates several forms of the invention, and in which:

FIG. 1 is a fragmentary top plan view partially in section of a power chain conveyor illustrating a load pick-up and guide wheel carriage device of the invention;

FIG. 2 is an exploded transverse sectional view showing how certain parts of the carriage device of FIG. 1 interfit;

FIG. 3 is a sectional view taken on line III—III of FIG. 1;

FIG. 4 is a side elevational view of the device of FIGS. 1–3 employed in conjunction with another form of guide wheel carriage of the invention;

FIG. 5 is a vertical longitudinal sectional view through still another form of guide wheel carriage device of the invention;

FIG. 6 is a top plan view of the device of FIG. 5;

FIG. 7 is a sectional view taken on line VII—VII of FIG. 6; and

FIG. 8 is a fragmentary sectional view of a modified form of roller-axle mounting arrangement.

Conveying systems of the type to which this invention relates include flexible power chains running in either overhead or underground trackways having load pick-up means extending from the trackway to engage load carrying hooks, racks, dollies, trolleys, or the like. For example, as shown herein the power chain supporting track is indicated at 10 to be of box-shaped cross section with the bottom wall thereof slotted as indicated at 12 to provide opposed track surfaces 11—11 upon which the power chain vertical guide rollers run, so that the trackway is adapted for overhead conveyor use. However, the slot may be in the top or in either side wall of the track member, depending upon the relative position of the power chain and the work to be conveyed.

The guide wheel carriage assembly of the invention is illustrated in FIGS. 1–3 of the drawing as being incorporated in a load driving link unit designated generally at 15 in which case a double set of paired vertical and horizontal wheels is used to provide stability against twisting of the unit within the channel trackway, such as might otherwise be encountered upon initial engagement of the moving load engaging means with a stationary load. However, it is to be understood that intermediately of the load pick-up units of the power chain, guide wheel carriages of the present invention employing only single sets of the vertical and horizontal wheels may be used to provide rolling support for the chain at positions intermediately of the driving units (FIGS. 4, 5, 6, 7).

As illustrated at FIGS. 1, 2, 3 and at the left hand portion of FIG. 4 herein, a guide carriage of the invention may be constructed to include a cast or forged metal body portion 16 which is flatted at its upper central surface as indicated at 18 to engage the lower face of a horizontally disposed chain link 20 of the power chain to be guided; and is vertically slotted at each end as indicated at 22, 22 to accommodate adjacent vertically disposed chain links 24, 24. The carriage body 16 is drilled and tapped centrally of the flatted surface 18 to receive a cap screw 26 which serves to assembly thereon a clamping plate 28 bearing against the top face of the horizontal chain link 20, and thereby effectively locking the carriage to the power chain 14.

At each end the carriage body 16 is formed with integrally cast stub axle portions 30, extending laterally from each side thereof. Each stub axle portion is horizontally slotted as indicated at 32 and is vertically drilled as shown at 34. Ball-bearing type horizontal guide wheels 36 are slip-fitted into the slots 32 for free rotation therein, the inner races 38 of the wheels being dimensioned to fit snugly within the slot to maintain the wheel firmly in operative position. The wheels 36 are then held against subsequent displacement by pins 40 which slip-fit into the drilled openings 34 and through the central bores 39 in the inner races 38 of the wheels.

The vertical guide wheels 42 of the carriage include inner races 44 which slip-fit over the stub axles 30; and as will be noted from the drawing, the inner races of the wheels 42 thereby serve to hold the pins 40 in proper positions in the openings 34. The outer faces of the wheel races 44 are beveled as indicated at 45; and subsequent to placement of the wheels 42 on the axles the outer peripheral ends of the axles are "spun" or "peened" to overlap the beveled portions 45 of the wheel races (FIG. 3). Thus, the vertical and horizontal guide wheels are locked in place by a fool-proof operation of extreme simplicity. Thus an easily assembled, compact, sturdily constructed, wheeled unit utilizing a minimum number of parts is provided, which gives rolling support for the conveyor power chain in both vertical and horizontal directions. Whereas, the wheeled carriage shown in FIGS. 1–3 of the drawing is for use as a load driving unit, it is illustrated as being provided with a drive lug 46 pivotally carried by a pin 47 mounted in an opening 48 formed in the body portion 16 of the carriage. However, other means may be used for load pick-up purposes in lieu thereof, and it is to be understood that this feature forms no part of the invention.

As illustrated at the right hand end portion of FIG. 4, another form of guide carriage of the invention is designated generally at 50 and is constructed to include a cast or forged metal saddle-like body portion 52 which includes upstanding cradle portions 54 at its opposite ends to embrace the lower faces of horizontally disposed chain links 20 of the power chain to be guided; and is centrally recessed to accommodate the intermediate vertically disposed chain link 24. The cradle portions 54 are drilled and tapped to each receive a cap screw 56 which serves to assemble thereon a clamping plate 58 which bears against the top face of the horizontal chain link 20, and thereby effectively lock the carriage to the power chain.

At each side the carriage body 52 is formed with transversely extending integrally cast stub axle portions 60—60, extending laterally from each side thereof. Each stub axle portion is horizontally slotted as indicated at 62 and is vertically drilled as in the case of the axles of FIG. 2 to receive vertical pins carrying the horizontal guide wheels 36 which are thus mounted in the axle slots. As in the case of FIG. 2, the vertical guide wheels 42 of the carriage include inner races 44 which slip-fit over the stub axles 60; and as explained hereinabove, the inner races of the wheels 42 thereby serve to hold the vertical pins in proper position. The outer faces of the wheel races 44 are beveled as explained hereinabove; and subsequent to placement of the wheels 42 on the axles the outer peripheral ends of the axles are "spun" or "peened" to overlap the beveled portions of the wheel races to thereby lock the vertical and horizontal guide wheels in place.

As illustrated in FIGS. 5–7 herein, another form of guide carriage device of the invention as designated generally at 70, may be constructed to comprise a one-piece axle bar 72 which is inwardly slotted horizontally at its opposite ends and vertically drilled therein to accommodate the horizontal guide wheels 36 as explained hereinabove; the vertical guide wheels being then slip-fitted upon the ends of the axle to lock the horizontal wheel pins in assembled relation. Furthermore, the ends of the axle bar are then "peened" over against the inner races of the vertical guide wheels, thus completing the axle-wheel assembly as explained hereinabove. To complete the carriage assembly, a pair of bent metal straps 74, 74 having centrally rounded portions 76 complementing the sectional form of the axle bar, are clamped in opposed relation upon the axle bar between the positions of the vertical guide wheels, by means of locking bolt and nut units 78—78. FIG. 8 illustrates a slightly modified form of guide roller mounting arrangement wherein the axle 72 is provided with a recess as indicated at 75 into which the material of the strap 74 is depressed as by means of a simple punch operation. This assures proper positioning and maintenance in locking relation of the strap and axle members. The ends of the strap plates 74—74 are so formed as to be in spaced apart relation, thus providing space therebetween for reception of horizontally disposed links 20 of the power chain; the vertical bolts 78 thus providing anchor posts upon which the chain links are thereby connected in articulated relation.

Thus, it will be appreciated that the present invention provides improvements in power chain guide wheel mounting arrangements such as are structurally simple and rugged, and overall compact, thereby avoiding any appreciable additions to the overall dimensions of the power chain; while at the same time the carriage parts are also designed so as to be inexpensively manufactured and assembled. Although only a few forms of the invention have been shown and described in detail, it will be apparent to those skilled in the art that the invention is not so limited but that various changes may be made therein without departing from the spirit of the invention or the scope of the appended claims.

We claim:

1. In a conveyor assembly, a guide wheel carriage comprising an elongate body, a pair of oppositely directed, lateral stub axle portions at each end of said body, a vertical guide wheel mounted on each stub axle portion, the intermediate portion of said body between said pairs of stub axle portions being of reduced height to define a saddle between the body ends, a length of conveyor chain, means fixing one horizontal link of said chain within said saddle, said body being provided with a vertical slot extending longitudinally thereof between each pair of stub axle portions and intersecting said saddle to accommodate the two adjacent vertical links of said chain on either side of said one horizontal link.

2. In a conveyor assembly, a guide wheel carriage comprising an elongate body, a pair of oppositely directed, lateral stub axle portions at each end of said body, the outer end of each stub axle portion being provided with a recess and there being a vertical bore through each stub axle portion adjacent its inboard end intersecting the respective recess, a horizontal guide wheel received in each recess and a pin received in each vertical bore retaining and locating a respective horizontal guide wheel, a vertical guide wheel mounted on each stub axle portion and in each case covering the vertical bore therein to retain the associated pin, the intermediate portion of said body between said pairs of stub axle portions being of reduced height to define a saddle between the body ends, a length of conveyor chain, means fixing one horizontal link of said chain within said saddle, said body being provided with a vertical slot extending longitudinally thereof between each pair of stub axle portions and intersecting said saddle to accommodate two adjacent vertical links of said chain on either side of said one horizontal link, said horizontal guide wheel being of a diameter less than the diameter of said stub axle portions and located within said recesses to project peripherally beyond said outer ends of the stub axle portions.

References Cited in the file of this patent

UNITED STATES PATENTS

| 851,701 | Spear | Apr. 30, 1907 |
| 881,908 | Demarest | Mar. 17, 1908 |
| 2,725,973 | King | Dec. 6, 1955 |

FOREIGN PATENTS

| 738,491 | Germany | Aug. 18, 1943 |